United States Patent Office 3,382,245
Patented May 7, 1968

3,382,245
DIAZAINDOLE COMPOUNDS AND PROCESS
FOR THEIR PRODUCTION
Holger Victor Hansen, Morris Plains, Sylvester Klutchko, Parsippany, and Robert I. Meltzer, Rockaway, N.J., assignors to Warner-Lambert Pharmaceutical Company, Morris Plains, N.J., a corporation of Delaware
No Drawing. Filed June 29, 1964, Ser. No. 378,978
32 Claims. (Cl. 260—250)

This invention relates to a new class of heterocyclic compounds. More particularly, this invention relates to 4,7-diazaindole compounds which correspond to the following structural formula:

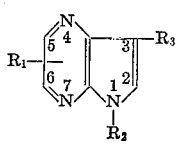

wherein $R_1$ represents hydrogen, lower alkyl such as methyl, ethyl, propyl and the like; $R_2$ represents hydrogen, lower alkyl such as methyl, ethyl, propyl, isopropyl, butyl, isobutyl, and the like, aralkyl such as benzyl, 4-pyridylmethyl, p-halophenethyl, α-naphthylphenethyl, and the like or acyl such as acetyl and benzoyl; and $R_3$ represents

wherein $R_4$ is hydrogen, lower alkyl or aralkyl;

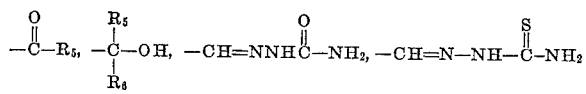

lower alkyl such as methyl, ethyl or propyl,

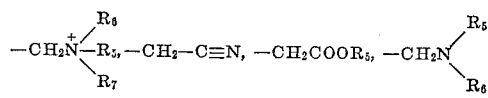

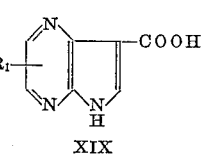

and —CH=CHNO$_2$ in which $R_5$, $R_6$ and $R_7$ represent lower alkyl or hydrogen and may be the same or different, and to the nontoxic pharmaceutically acceptable acid addition salts thereof. The symbols $R_1$, $R_2$, $R_3$, $R_4$, $R_5$, $R_6$, and $R_7$ as used hereinafter have the same meaning as defined.

The 4,7-diazaindoles of this invention may also be considered as a pyrazine derivative and named as 5H-pyrrol [2,3-b] pyrazine and when the latter nomenclature is employed the numbering of this ring system is as follows:

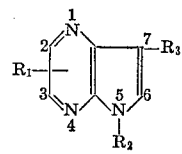

This invention also includes within its scope novel processes for the production of these novel diazaindole compounds.

The novel diazaindole compounds of this invention exhibit significant pharmacological properties and are useful in the treatment of cardiovascular diseases such as hypertension.

Reactions involved in the preparation of the compounds of this invention may be illustrated by the following schematic diagram.

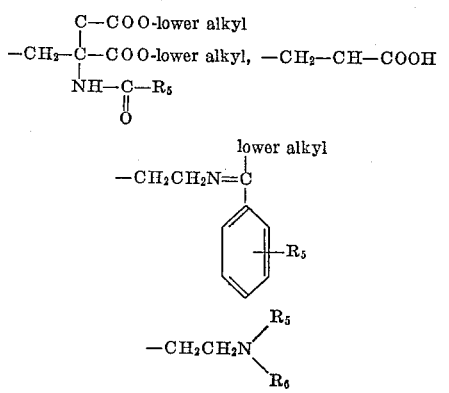

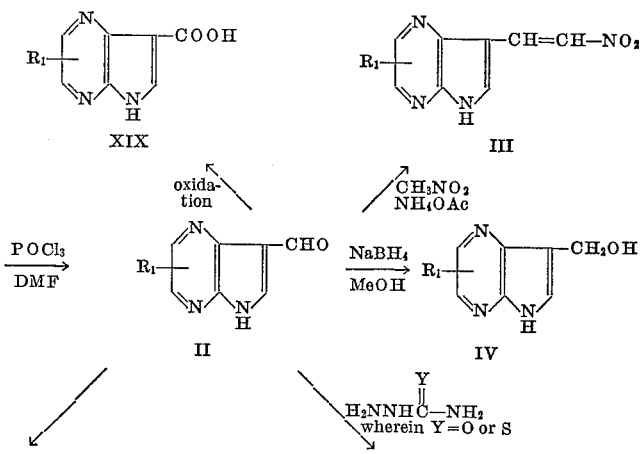

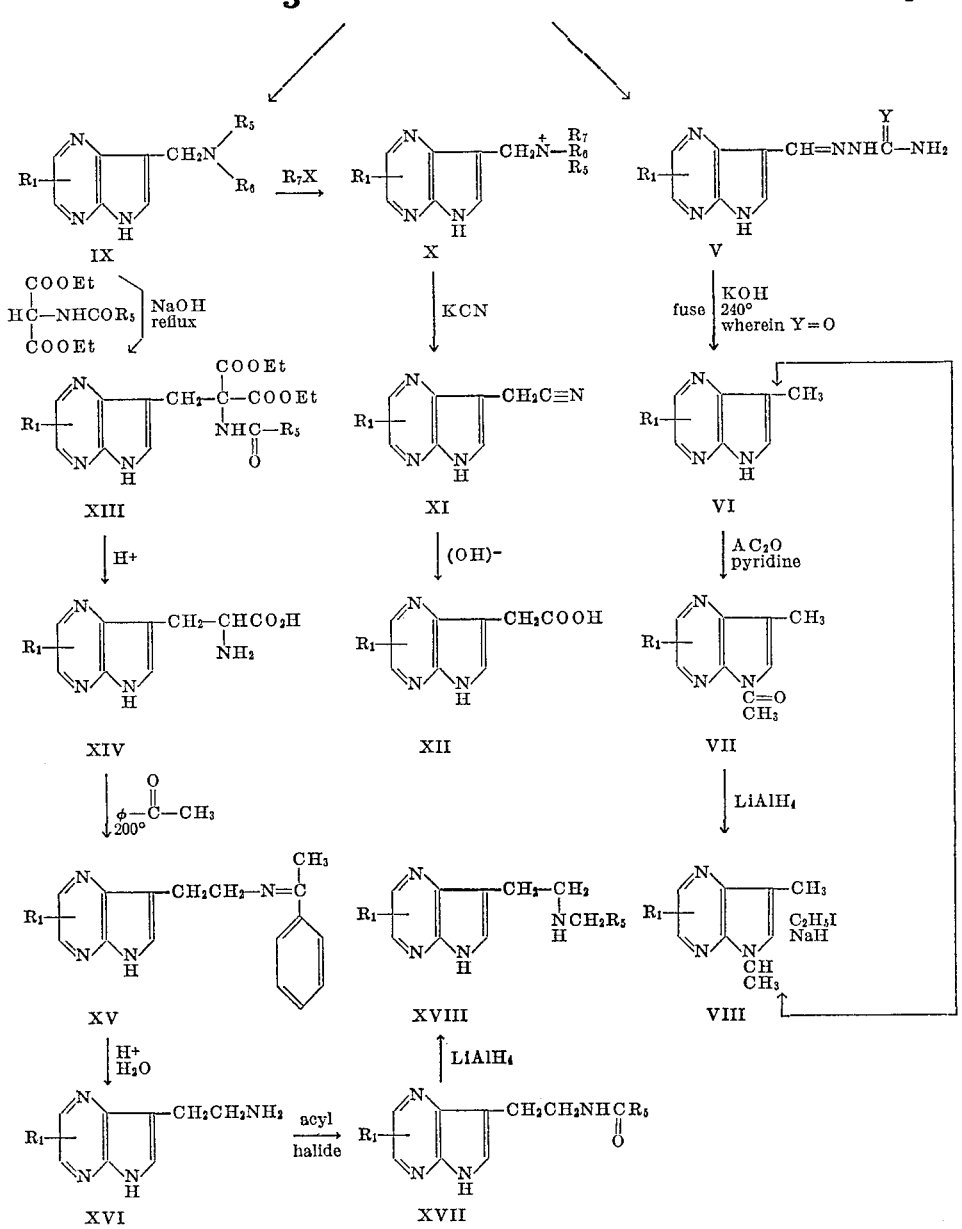

Variation in the order of steps and/or reagents will provide the specifically desired compounds.

Referring more specifically to the schematic diagram of the reactions, the first step involves the preparation of a diazaindole nucleus (II) by ring closing and $R_1$-substituted-2-amino-3-methylpyrazine (I) with an acid condensing reagent such as phosphorous oxychloride, thionyl chloride or phosgene, for example, in an N,N-disubstituted formamide such as dimethylformamide preferably at a temperature range of about 40°–120° C. The dimethylformamide and the acid condensing reagent form a Vilsmeier reagent which contributes the aldehyde carbon and one carbon atom of the 5-member heterocyclic ring. The resulting 5H-pyrrolo[2,3-b]pyrazine - 7 - carboxaldehyde (II) is treated further to give other diazaindole compounds of this invention. Other starting materials such as $R_1$-substituted-2-lower alkyl or aralkylamino-3-methylpyrazine may also be employed.

Other N,N-disubstituted formamide which may also be employed include, for example, diethylformamide, N-methylformanilide and the like. Treatment of (II) with nitromethane in the presence of ammonium acetate at a temperature of 100° C. results in the formation of (III). Compound (II) may also be treated with a complex alkali metal hydride such as sodium or potassium borohydride in the presence of a lower aliphatic alcohol such as methanol or ethanol to give (IV). Treatment of (II) with semicarbazide in the presence of strong acids such as 6 N hydrochloric acid yields the corresponding semicarbazone (V) in which Y is oxygen. The latter on fusion with powdered potassium hydroxide or sodium hydroxide at a temperature of about 240° C. yields (VI).

Compound (VI) may be treated with an acylating agent such as acetic anhydride in the presence of pyridine to give the corresponding N-acetyl substituted derivative (VII) or it may be treated with an alkylating agent such as methyl iodide or ethyl sulfate in the presence of sodium hydride to give the corresponding N-lower alkyl subsittuted diazaindole (VIII). Compound (VIII) may also be produced by reduction of (VII) with a reagent such as lithium aluminum hydride.

Returning to compound (II) it may also be treated with dialkylamine in the presence of a complex alkali metal hydride at about 10° to 15° C. to form compound (IX). Compound (II) may be oxidized with oxidizing agents such as with dilute $KMnO_4$ to yield (XIX).

Compound (IX) may be converted to the corresponding quaternary compound (X) by reacting with an alkyl halide $R_7X$ such as methyl iodide. The resulting quarternary compound such as (X) may be treated further without isolation with potassium cyanide at about 90° C. to give the corresponding cyano substituted compound (XI). The latter on hydrolysis in a basic medium yields the corresponding carboxylic acid (XII).

Compound (IX) where $R_5$ and $R_6$ are methyl may also be reacted by refluxing with ethyl acetamidomalonate in an inert high boiling solvent such as xylene and in the presence of a strong base such as potassium hydroxide to give compound (XIII). Prolonged heating of (XIII) such as 8 hours at about 80° to 90° C. in the presence of an acid such as hydrochloric acid yields the corresponding free amino acid (XIV).

The amino acid (XIV) may be reacted further with acetophenone at a high temperature such as 200° C. to give (XV).

Finally, compound (XV) may be hydrolyzed in an acid media to give compound (XVI). The latter may in turn be reacted with an acyl halide to give (XVII) which on reduction yields (XVIII).

The compounds of this invention may be converted into the corresponding acid addition salts by reacting the free base with an acid such as hydrochloric, hydrobromic, hydroiodic, sulfuric, nitric, acetic, phosphoric and the like. The salt may be produced by reacting the base with the selected acid in a suitable solvent such as ethyl acetate, methanol and the like and recovering the salt in the form of a precipitate.

For therapeutic uses the selected 4,7-diazaindole or its salts may be combined with a standard pharmaceutical carrier to form dosage forms such as tablets, pills, capsules, suspensions, solutions for injection and the like.

The following examples are included in order further to illustrate the invention. All temperatures are given in degrees centigrade.

EXAMPLE 1

5H-pyrrolo[2,3-b]pyrazine-7-carboxaldehyde

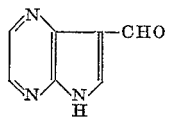

With stirring, 460 g. (3.0 mols) of phosphorous oxychloride are added to one liter of dimethylformamide, keeping the temperature at about 50° with ice bath cooling. A quantity of 109 g. (1.0 mol) of 2-amino-3-methylpyrazine is added to this red solution. The temperature quickly rises to 110°. The temperature is prevented from exceeding 110° by ice bath cooling. After several minutes, the ice bath is removed (temperature=105°) and the reaction solution is allowed to gradually cool over a period of two hours. The very dark and viscous reaction solution is poured gradually into 400 ml. of water with stirring. The temperature rises quickly and is maintained at 50°–55° by periodically adding ice chips. The final volume of the solution is about 3 liters. A 10 M potassium hydroxide solution is added under cooling and stirring to pH 2, maintaining a temperature of about 55°, resulting in the separation of 5H-pyrrolo[2,3-b]pyrazine-7-carboxaldehyde as a tan solid. The cooled mixture is filtered and the filter cake is washed well with water, then with 200 ml. of 2-propanol and finally with 200 ml. of petroleum ether. The dried product weighs 84.0 g. (56.2%) and melts at 313°–315° (dec.). This material may be purified by dissolving in 1 N sodium hydroxide and acidifying the solution with acetic acid. The product is filtered and washed well with water. The melting point of white analytically pure material is 315°–317° (dec.).

EXAMPLE 2

7-dimethylaminomethyl-5H-pyrrolo[2,3-b]pyrazine

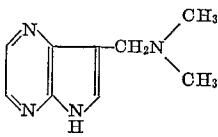

A volume of 65 ml. of 40% aqueous dimethylamine is added to a suspension of 20.5 g. (0.14 mol) of 5H-pyrrolo-[2,3-b]pyrazine-7-carboxaldehyde in 200 ml. of water. At a temperature of 15° the resulting solution is treated with 21.0 g. (0.55 mol) sodium borohydride over a period of five minutes. The solution is stirred at room temperature for four hours. Solid potassium carbonate is added to saltout an oily layer which is extracted into 300 ml. of methylene chloride. The solution is decolorized, dried over potassium carbonate and concentrated to give 19.0 g. (77%) of 7 - dimethylaminomethyl-5H-pyrrolo[2,3-b] pyrazine as a light yellow solid with melting point 153°–155°. Recrystallization from ethyl acetate gives pure white crystals, M.P. 155°–157°.

EXAMPLE 3

5H-pyrrolo[2,3-b]pyrazine-7-carboxaldehyde semicarbazone

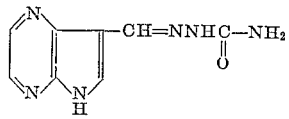

A solution of 44.1 g. (0.3 mol) of 5H-pyrrolo[2,3-b]-pyrazine-7-carboxaldehyde in 300 ml. of 6 N hydrochloric acid is treated with a solution of 39.0 g. (0.35 mol) of semicarbazide hydrochloride in 300 ml. of 6 N hydrochloric acid. The clear solution yields orange-red crystals on standing. After one-half hour the mixture is filtered and washed twice with 50 ml. of 6 N hydrochloric acid, 300 ml. of water, then with 200 ml. of 2-propanol and finally with petroleum ether to give 66 g. of 5H-pyrrolo-[2,3-b]pyrazine-7-carboxaldehyde semicarbazone hydrochloride. The purified base melts at 315°–325° (dec.).

EXAMPLE 4

7-methyl-5H-pyrrolo[2,3-b]pyrazine

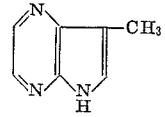

A mixture of 60 g. (0.249 mol) of the semicarbazone hydrochloride obtained in accordance with Example 3 and 120 g. of powdered potassium hydroxide is fused at 240° for 20 minutes. The cooled mixture is treated with ca. 300 g. of chipped ice and the insoluble solid is filtered and washed well with water to give 21 g. (42%) of crude 7-methyl - 5H-pyrrolo[2,3-b]pyrazine. Recrystallization from absolute ethanol gives purified material, M.P. 221°–222°. The pure hydrochloride exists as yellow crystals, M.P. 231°–235° (dec.).

EXAMPLE 5

Diethyl-2-acetamido-2-(5H-pyrrolo[2,3-b]pyrazin-7-ylmethyl)malonate

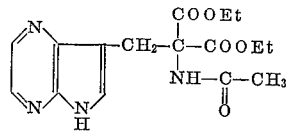

A mixture of 3.0 g. powdered sodium hydroxide and 500 ml. of dry xylene is heated to reflux with stirring. At the boiling point a mixture of 25.2 g. (0.143 mol) of 7- dimethylaminomethyl - 5H - pyrrolo[2,3-b]pyrazine and 31.0 g. (0.143 mol) of ethyl acetamidomalonate is added portion-wise over a period of 3 minutes. The solution is refluxed for 6 hours and then filtered hot. On cooling white crystals separate. The mixture is filtered to give 26.5 g. of diethyl-2-acetamido - 2 - (5H - pyrrolo[2,3-b]pyrazin-7-yl-methyl)malonate, M.P. 165°–167°. Recrystallization from ethyl acetate gives material of analytical quality, M.P. 165°–167°.

EXAMPLE 6

3-(5H-pyrrolo[2,3-b]pyrazin-7-yl)alanine

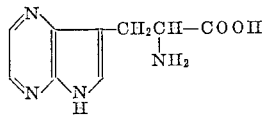

A solution of 17.4 g. (0.04 mol) of the ester obtained as in Example 5 in 250 ml. of concentrated hydrochloric acid is heated on the steam bath for 8 hours. The yellow solution is concentrated to dryness. The residue is dissolved in 400 ml. of water and the pH is adjusted to 7.8–8 with concentrated ammonium hydroxide. The separated amino acid is filtered, washed with cold water and dried to give 9.5 g. of 3-(5H-pyrrolo[2,3-b]pyrazin-7-yl)alanine, M.P. 313°–315° (dec.). Purification is accomplished by dissolving the product in 6 N hydrochloric acid and adjusting the pH to 7.5–8 with concentrated ammonium hydroxide. The pure material melts at 314°–316° (dec.).

EXAMPLE 7

N-(phenylethylidene)-2-(5H-pyrrolo[2,3-b]pyrazin-7-yl)ethylamine

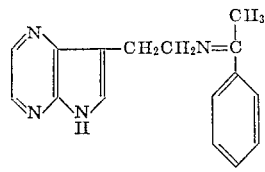

A suspension of 13.8 g. (0.067 mol) of 3-(5H-pyrrolo[2,3-b]pyrazin-7-yl)alanine in 300 ml. of acetophenone is heated with stirring to 200° for 20 minutes. The red solution is cooled. The crystals which separate are filtered and washed with 20 ml. of 2-propanol and then petroleum ether to give 7.2 g. of N-(phenylethylidene)-2-(5H-pyrrolo[2,3 - b]pyrazin - 7-yl)ethylamine, M.P. 205°–207°. Purification by recrystallization from 2-propanol gives pure material, M.P. 213°–215°.

EXAMPLE 8

7-(2-aminoethyl)-5H-pyrrolo[2,3-b]pyrazine

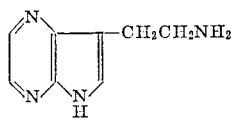

A solution of 7.0 g. (0.027 mol) of the compound as obtained in Example 7 in 100 ml. 3 N hydrochloric acid is heated for one-half hour on the steam bath. The separated acetophenone is extracted with ether. The aqueous phase is neutralized (pH 7) with 10 M KOH and then solid potassium carbonate is added to saturate the solution. The product is extracted with a total of one liter of methylene chloride. After removal of the solvent there is obtained 3.5 g. of 7-(2-aminoethyl)-5H-pyrrolo[2,3-b]pyrazine as a solid. Purification is accomplished by preparing a mono sulfate derivative involving treating the crude base with an equivalent weight of sulfuric acid. The purified sulfate melts at 222°–224°.

EXAMPLE 9

7-cyanomethyl-5H-pyrrolo[2,3-b]pyrazine

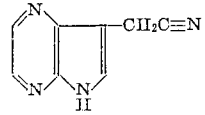

A solution of 21.0 g. (0.119 mol) of 7-dimethylaminomethyl-5H-pyrrolo[2,3-b]pyrazine in one liter of ethyl acetate is quaternized with methyl iodide forming 5H-pyrrolo[2,3-b]pyrazin-7-yl methyl trimethyl ammonium iodide. The crude quaternary is treated with a solution of 13.1 g. (0.2 mol) of potassium cyanide in 100 ml. of water at 90° for 15 minutes to give 8.8 g. (56%) of 7-cyanomethyl-5H-pyrrolo[2,3-b]pyrazine. Recrystallization from methanol gives the pure, pale yellow nitrile, M.P. 221°–223°.

EXAMPLE 10

5-acetyl-7-methyl-5H-pyrrolo[2,3-b]pyrazine

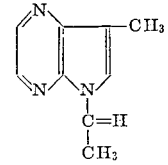

A mixture of 10.0 g. (0.0752 mol) of 7-methyl-5H-pyrrolo[2,3-b]pyrazine, 25 ml. of acetic anhydride and 15 ml. of pyridine is heated on the steam bath for two hours. The resulting solution is concentrated to dryness. To the viscous residue is added 150 ml. of water. The resulting crystalline material is filtered, washed well with water to give 11.6 g. (88%) of 5-acetyl-7-methyl-5H-pyrrolo[2,3-b]pyrazine, M.P. 95°–97°. Recrystallization from Skellysolve C (n-heptane, B.P. 90°–100°) gives pure, white crystals, M.P. 95°–97°.

EXAMPLE 11

5,7-dimethyl-5H-pyrrolo[2,3-b]pyrazine

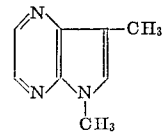

A quantity of 8.0 g. (0.06 mol) of 7-methyl-5H-pyrrolo[2,3-b]pyrazine is added to a stirred suspension of 7.68 g. (0.16 mol) of 50% sodium hydride mineral-oil in 200 ml. of tetrahydrofuran. The mixture becomes yellow as hydrogen is vigorously evolved. With ice bath cooling a solution of 9.04 g. (0.064 mol) of methyl iodide in 100 ml. tetrahydrofuran is added over a period of 10 minutes. After 45 minutes at room temperature the mixture is filtered. The filtrate is diluted with ether and filtered again. The filtrate is treated with HCl gas to precipitate 7.0 g. (64%) of the crude 5,7-dimethyl-5H-pyrrolo[2,3-b]pyrazine. Recrystallization from 2-propanol gives the pure yellow crystalline solid, M.P. 217°–219°. The free base is obtained by treating the pure hydrochloride salt with sodium hydroxide.

EXAMPLE 12

7-(2-nitrovinyl)-5H-pyrrolo[2,3-b]pyrazine

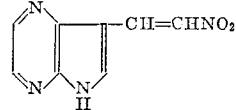

A mixture of 83.0 g. (0.564 mol) of 5H-pyrrolo[2,3-b]pyrazine-7-carboxaldehyde, 450 ml. of nitromethane and 10 g. of ammonium acetate is heated with stirring at 100° for one hour. The cooled mixture is filtered and washed with 300 ml. of 2-propanol. The filter cake is triturated with water and filtered to give 93.0 g. (87%) of the nitrovinyl derivative. Pure material is obtained by recrystallizing from dimethylformamide, M.P. 245°–247° (dec.).

EXAMPLE 13

7-(hydroxymethyl)-5H-pyrrolo[2,3-b]pyrazine

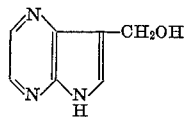

A suspension of 1.5 g. (0.01 mol) of 5H-pyrrolo[2,3-b]pyrazine-7-carboxaldehyde in 30 ml. of methanol is treated with 1.5 g. of sodium borohydride. After one-half hour at room temperature the reaction mixture is filtered to give 0.9 g. (55%) of 7-(hydroxymethyl)-5H-pyrrolo[2,3-b]pyrazine, M.P. 186°–188°. Recrystallization from absolute ethanol gives the pure alcohol, M.P. 201°–203°.

EXAMPLE 14

5H-pyrrolo[2,3-b]pyrazine-7-acetic acid

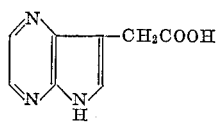

A mixture of 7.0 g. (0.044 mol) of 7-cyanomethyl-5H-pyrrolo[2,3-b]pyrazine and 30 ml. of 10 M potassium hydroxide is heated on the steam bath for two hours. The cooled mixture is filtered. The pH of the filtrate is adjusted to pH 2 with 6 N hydrochloric acid. The mixture is filtered and the filtrate is concentrated to dryness. The residue is triturated with 50 ml. of methanol and the insoluble salts are filtered. Ether is added to the methanol filtrate until slightly turbid and these traces of salts are filtered. Ether (500 ml.) is again added to the filtrate to precipitate the crude 5H-pyrrolo[2,3-b]pyrazine-7-acetic acid, M.P. 217°–220°. The product is purified by recrystallization from methanol-ethyl acetate, M.P. 220°–222° (dec.). The free base may be recovered by treating the hydrochloride salt with sodium hydroxide.

It is understood that the foregoing detailed description is given merely by way of illustration and that many variations may be made therein without departing from the spirit of our invention.

Having described our invention, what we desire to secure by Letters Patent is:

1. A compound selected from the group consisting of the free base of the formula:

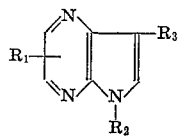

wherein $R_1$ is a member of the group consisting of hydrogen and lower alkyl; $R_2$ is a member of the group consisting of hydrogen, lower alkyl, phenyl lower alkyl and lower alkanoyl; and $R_3$ is a member of the group consisting of

in which $R_4$ is a member of the group consisting of hydrogen, lower alkyl and phenyl lower alkyl;

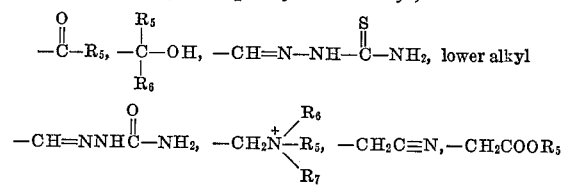

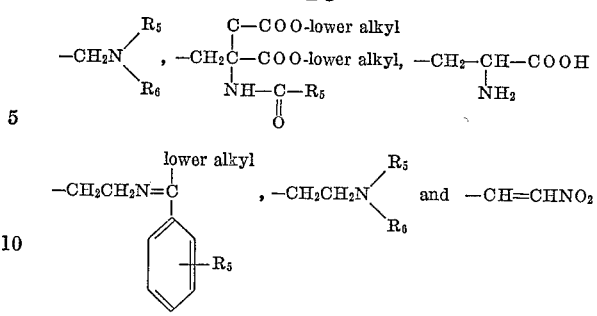

in which $R_5$, $R_6$ and $R_7$ is each a member of the group consisting of hydrogen and lower alkyl and the nontoxic pharmaceutically acceptable acid addition salts.

2. 5H-pyrrolo[2,3-b]pyrazine-7-carboxaldehyde.
3. 7-dimethylaminomethyl-5H-pyrrolo[2,3-b]pyrazine.
4. 5H - pyrrolo[2,3-b]pyrazine - 7 - carboxaldehyde semicarbazone.
5. 5H - pyrrolo[2,3-b]pyrazine - 7 - carboxaldehyde thiosemicarbazone.
6. 7-methyl-5H-pyrrolo[2,3-b]pyrazine.
7. Diethyl - 2 - acetamido - 2 - (5H - pyrrolo[2,3-b]pyrazine-7-yl-methyl)malonate.
8. 3-(5H-pyrrolo[2,3-b]pyrazin-7-yl)alanine.
9. N - (1 - phenylethylidene) - 2 - (5H-pyrrolo[2,3-b]pyrazin-7-yl)ethylamine.
10. 7-(2-aminoethyl)-5H-pyrrolo[2,3-b]pyrazine.
11. 7-cyanomethyl-5H-pyrrolo[2,3-b]pyrazine.
12. 5-acetyl-7-methyl-5H-pyrrolo[2,3-b]pyrazine.
13. 5,7-dimethyl-5H-pyrrolo[2,3-b]pyrazine.
14. 7-(2-nitrovinyl)-5H-pyrrolo[2,3-b]pyrazine.
15. 7-(hydroxymethyl)-5H-pyrrolo[2,3-b]pyrazine.
16. 5H - pyrrolo[2,3-b]pyrazine-7-acetic acid.
17. 5H - pyrrolo[2,3-b]pyrazin - 7 - ylmethyltrimethyl ammonium iodide.
18. Process for the production of a compound of the formula:

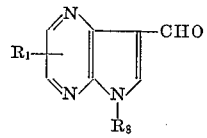

wherein $R_1$ and $R_8$ are each a member of the group consisting of hydrogen, lower alkyl and phenyl lower alkyl which comprises contacting a compound of the formula:

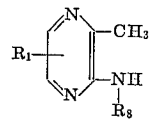

with a member of the group consisting of phosphorous oxychloride, phosgene and $PCl_5$ at a temperature of about 40°–120° C. in an N,N-disubstituted formamide.

19. Process for the production of a compound of the formula:

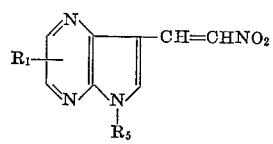

wherein $R_1$ and $R_5$ are each a member of the group consisting of hydrogen and lower alkyl which comprises contacting a compound of the formula:

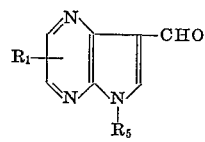

with nitromethane in the presence of ammonium acetate.

20. Process for the production of a compound of the formula:

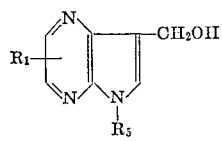

wherein $R_1$ and $R_5$ are each a member of the group consisting of hydrogen and lower alkyl which comprises reducing a compound of the formula:

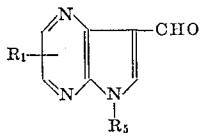

21. Process for the production of a compound of the formula:

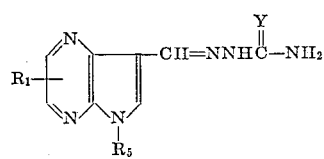

wherein $R_1$ and $R_5$ are each a member of the group consisting of hydrogen and lower alkyl and Y is a member of the group consisting of oxygen and sulfur which comprises contacting a compound of the formula:

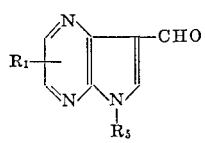

with a compound of the formula:

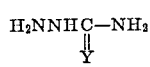

22. Process for the production of a compound of the formula:

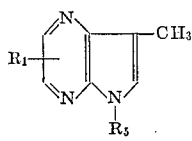

wherein $R_1$ and $R_5$ are each a member of the group consisting of hydrogen and lower alkyl which comprises contacting a compound of the formula:

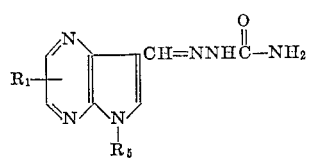

with an alkali metal hydroxide at a temperature of about 240° C.

23. Process for the production of a compound of the formula:

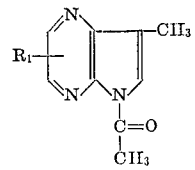

wherein $R_1$ is a member of the group consisting of hydrogen and lower alkyl which comprises reacting a compound of the formula:

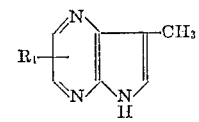

with acetic anhydride.

24. Process for the production of a compound of the formula:

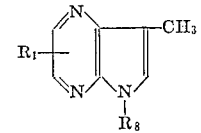

wherein $R_1$ is a member of the group consisting of hydrogen and lower alkyl and $R_8$ is a member of the group consisting of lower alkyl and phenyl lower alkyl which comprises contacting a compound of the formula:

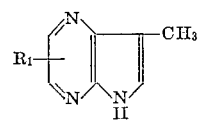

with an alkylating agent.

25. Process in accordance with claim 24 wherein said alkylating agent is a member of the group consisting of methyl iodide and diethyl sulfate in the presence of alkali metal hydride.

26. Process for the production of a compound of the formula:

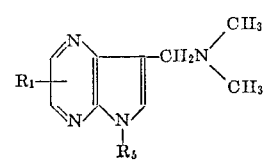

wherein $R_1$ and $R_5$ are each a member of the group consisting of hydrogen and lower alkyl which comprises contacting a compound of the formula:

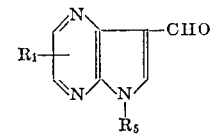

with dimethylamine in the presence of a complex alkali metal hydride.

27. Process for the production of a compound of the formula:

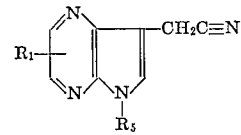

wherein $R_1$ and $R_5$ are each a member of the group consisting of hydrogen and lower alkyl which comprises contacting a compound of the formula:

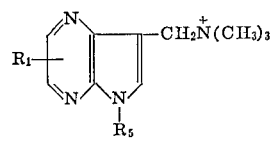

with potassium cyanide.

28. Process for the production of a compound of the formula:

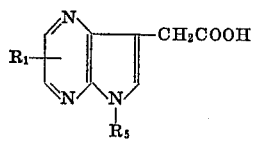

wherein $R_1$ and $R_5$ are each a member of the group consisting of hydrogen and lower alkyl which comprises contacting a compound of the formula:

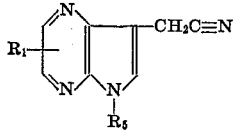

with a basic aqueous solvent.

29. Process for the production of a compound of the formula:

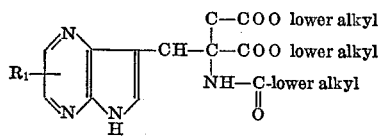

wherein $R_1$ is a member of the group consisting of hydrogen and lower alkyl which comprises contacting a compound of the formula:

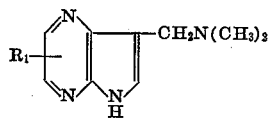

with a compound of the formula:

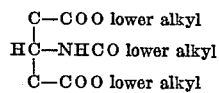

in the presence of an alkali metal hydroxide in an inert high boiling solvent.

30. Process for the production of a compound of the formula:

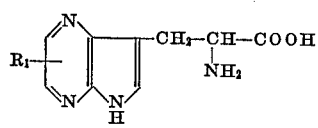

wherein $R_1$ is a member of the group consisting of hydrogen and lower alkyl which comprises contacting a compound of the formula:

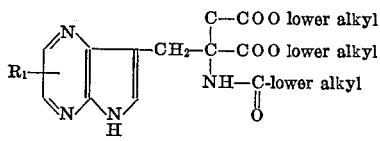

with a mineral acid.

31. Process for the production of a compound of the formula:

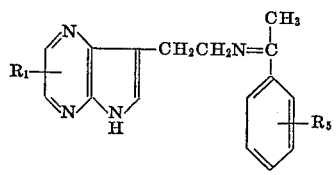

wherein $R_1$ and $R_5$ are each a member of the group consisting of hydrogen and lower alkyl which comprises contacting a compound of the formula:

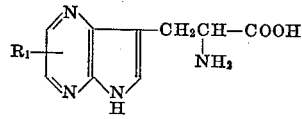

with acetophenone at a temperature of about 200° C.

32. Process for the production of a compound of the formula:

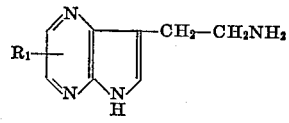

which comprises contacting a compound of the formula:

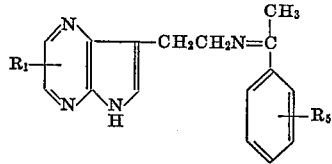

wherein $R_5$ is a member of the group consisting of hydrogen and lower alkyl with an acidic aqueous medium.

No references cited.

NICHOLAS S. RIZZO, *Primary Examiner.*
F. A. MIKA, *Assistant Examiner.*